(12) United States Patent
Roberge (10) Patent No.: US 11,346,244 B2
(45) Date of Patent: May 31, 2022

(54) HEAT TRANSFER AUGMENTATION FEATURE

(71) Applicant: Raytheon Technologies Corporation, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 78 days.

(21) Appl. No.: 16/860,481

(22) Filed: Apr. 28, 2020

(65) Prior Publication Data

US 2020/0386119 A1 Dec. 10, 2020

Related U.S. Application Data (60) Provisional application No. 62/842,000, filed on May 2, 2019.

(51) Int. Cl.
| | |
|---|---|
| *F01D 25/10* | (2006.01) |
| *F01D 25/12* | (2006.01) |
| *F02C 7/18* | (2006.01) |
| *F28F 1/12* | (2006.01) |

(52) U.S. Cl.
CPC ............. *F01D 25/10* (2013.01); *F01D 25/12* (2013.01); *F02C 7/185* (2013.01); *F28F 1/12* (2013.01); *F05D 2260/232* (2013.01)

(58) Field of Classification Search
CPC .. F01D 25/10; F01D 25/12; F02C 7/10; F02C 7/12; F02C 7/14; F02C 7/18; F02C 7/185; F28F 1/12; F05D 2260/22141; F05D 2260/232

See application file for complete search history.

(56) References Cited

U.S. PATENT DOCUMENTS

| | | | | |
|---|---|---|---|---|
| 2,549,621 A | * | 4/1951 | Moore, Jr. ............. | G01K 13/02 318/641 |
| 2,549,622 A | * | 4/1951 | Nash ...................... | G01K 13/02 73/861.47 |
| 2,704,439 A | * | 3/1955 | Cousins .................... | F02C 7/08 60/39.511 |
| 2,731,245 A | * | 1/1956 | McChesney ............... | F28F 1/12 165/184 |
| 3,020,027 A | * | 2/1962 | Dumpleton ............... | F28F 1/12 165/181 |

(Continued)

FOREIGN PATENT DOCUMENTS

| | | |
|---|---|---|
| CN | 109654737 A | 4/2019 |
| EP | 2963248 A1 | 1/2016 |
| EP | 3239493 A1 | 11/2017 |

OTHER PUBLICATIONS

European Search Report for European Application No. 20172468.9 dated Sep. 14, 2020.

*Primary Examiner* — Craig Kim
(74) *Attorney, Agent, or Firm* — Carlson, Gaskey & Olds, P.C.

(57) ABSTRACT

A thermal management system includes a heat exchanger defining a confined volume for thermal transfer between a first flow within a first passage and a second flow within a second passage. A first conduit outside the confined volume communicates the first flow to the first passage of the heat exchanger. A thermal transfer augmenter is attached to the first conduit.

16 Claims, 8 Drawing Sheets

(56) References Cited

U.S. PATENT DOCUMENTS

| | | | | |
|---|---|---|---|---|
| 3,116,604 | A * | 1/1964 | Holl | F02C 7/08 165/125 |
| 3,183,970 | A * | 5/1965 | Worley | F28F 1/124 165/181 |
| 3,537,516 | A * | 11/1970 | Kunz | F28F 1/12 165/181 |
| 3,756,020 | A * | 9/1973 | Moskowitz | F02C 7/14 415/176 |
| 5,269,133 | A * | 12/1993 | Wallace | F02C 7/185 165/142 |
| 5,317,877 | A * | 6/1994 | Stuart | F02C 7/185 60/736 |
| 5,377,746 | A * | 1/1995 | Reid | F28F 1/36 165/184 |
| 6,092,361 | A * | 7/2000 | Romani | F02C 3/10 60/39.511 |
| 6,295,803 | B1 * | 10/2001 | Bancalari | F02C 7/08 415/114 |
| 6,962,054 | B1 * | 11/2005 | Linney | F02C 7/224 60/671 |
| 7,862,293 | B2 * | 1/2011 | Olver | F02C 6/08 415/177 |
| 2016/0108813 | A1 * | 4/2016 | Schmitz | F02C 7/14 60/39.511 |
| 2016/0237905 | A1 * | 8/2016 | Suciu | F02C 7/185 |
| 2016/0312797 | A1 * | 10/2016 | Suciu | F04D 29/5826 |
| 2017/0167385 | A1 * | 6/2017 | Hill | F02C 7/224 |
| 2017/0307311 | A1 * | 10/2017 | Schwarz | F28F 21/087 |
| 2018/0058328 | A1 * | 3/2018 | Schwarz | F02C 7/141 |
| 2018/0202357 | A1 * | 7/2018 | Julien | F02C 5/00 |
| 2018/0202358 | A1 * | 7/2018 | Julien | F02C 9/18 |
| 2018/0258860 | A1 | 9/2018 | Suciu et al. | |
| 2019/0153953 | A1 * | 5/2019 | Niergarth | F02C 7/224 |
| 2019/0203644 | A1 * | 7/2019 | Niergarth | F02C 7/22 |
| 2020/0095889 | A1 * | 3/2020 | Sebastian | F02C 7/18 |
| 2020/0386119 | A1 * | 12/2020 | Roberge | F02C 9/18 |
| 2021/0388730 | A1 * | 12/2021 | Spain | F02K 3/115 |
| 2022/0049909 | A1 * | 2/2022 | Hicks, II | F28D 7/06 |

* cited by examiner

HEAT TRANSFER AUGMENTATION FEATURE

CROSS-REFERENCE TO RELATED APPLICATIONS

This application claims priority to U.S. Provisional Application No. 62/842,000 which was filed on May 2, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

The high-energy exhaust gas flow as well as heat producing components of the gas turbine engine necessitate the use of heat exchangers to maintain temperatures of components, lubricant and other structures. Heat exchangers are also used to cool pressurized air supplied to interface with aircraft systems including environmental control systems. A heat exchanger provides for the transfer of thermal energy between a coolant and a hot flow. The heat exchanger is specifically structured to provide an increased transfer of thermal energy within a defined space. Conduits are provided that direct the flow of fluids to and from the heat exchanger.

Turbine engine manufacturers continue to seek further improvements to engine performance including improvements to thermal transfer efficiencies.

SUMMARY

A thermal management system according to an exemplary embodiment of this disclosure includes, among other possible things, a heat exchanger defining a confined volume for thermal transfer between a first flow within a first passage and a second flow within a second passage. A first conduit outside the confined volume communicates the first flow to the first passage of the heat exchanger. A thermal transfer augmenter is attached to the first conduit.

In a further embodiment of the foregoing thermal management system, the thermal transfer augmenter comprises a plurality of fins extending radially outward from the first conduit.

In a further embodiment of any of the foregoing thermal management systems, the thermal transfer augmenter comprises a plurality of parallel extending fins that extend outward from the first conduit.

In a further embodiment of any of the foregoing thermal management systems, an interface provides a thermally conductive contact with an outer surface of the first conduit and the thermal transfer augmenter.

In a further embodiment of any of the foregoing thermal management systems, the thermal transfer augmenter is split into at least two sections attachable around the first conduit.

In a further embodiment of any of the foregoing thermal management systems, at least one clamp secures the at least two sections around the first conduit.

In a further embodiment of any of the foregoing thermal management systems, the thermal transfer augmenter comprises a fairing defining a flow path around the first conduit and a plurality of fins extending from the fairing.

In a further embodiment of any of the foregoing thermal management systems, the fairing includes a first portion corresponding to a shape of the first conduit and a second portion downstream of the first portion. The second portion tapers to a trailing point.

In a further embodiment of any of the foregoing thermal management systems, the plurality of fins extends from the fairing an equal distance to follow a contour of the first portion and the second portion.

A gas turbine engine, according to an exemplary embodiment of this disclosure includes, among other possible things, a fan section that drives air along a bypass flow path, and a conduit at least partially exposed to a flow through the bypass flow path, and the conduit. A thermal transfer augmenter is attached to the first conduit.

In a further embodiment of the foregoing gas turbine engine, a compressor section and a turbine section is included. The conduit communicates bleed air from the compressor section to the turbine section.

In a further embodiment of any of the foregoing gas turbine engines, a heat exchanger defines the confined volume for thermal transfer between a first flow within a first passage and the flow of air through the bypass flow path. The conduit provides for the communication of the first flow to the confined volume of the heat exchanger.

In a further embodiment of any of the foregoing thermal management systems, a second conduit provides for the communication of the first flow exiting the heat exchanger to a component of the gas turbine engine.

In a further embodiment of any of the foregoing thermal management systems, the thermal transfer augmenter comprises a plurality of fins extending radially outward from the first conduit.

In a further embodiment of any of the foregoing thermal management systems, the thermal transfer augmenter comprises a plurality of parallel extending fins that extend outward from the first conduit.

In a further embodiment of any of the foregoing thermal management systems, the thermal transfer augmenter comprises a fairing defining a flow path around the first conduit and a plurality of fins extending from the fairing. The fairing comprising a first portion corresponding to a shape of the first conduit and a second portion downstream of the first portion. The second portion tapering to a trailing point.

A method of augmenting heat transfer according to an exemplary embodiment of this disclosure includes, among other possible things, directing a first flow through a first conduit to a first passage of a heat exchanger and directing a second flow to a second passage of the heat exchanger. The heat exchanger defines a confined volume where the first passage is in thermal communication with the second passage, transferring heat from the first flow through a thermal transfer augmenter assembled to the first conduit outside of the confined volume of the heat exchanger.

In a further embodiment of the foregoing method of augmenting heat transfer, the thermal transfer augmenter comprises a plurality of fins split into at least two sections and including assembling the at least two sections around the first conduit.

In a further embodiment of any of the foregoing methods of augmenting heat transfers, the thermal transfer augmenter comprises a plurality of fins that extend outward from the first conduit.

In a further embodiment of any of the foregoing methods of augmenting heat transfers, the thermal transfer augmenter comprises a fairing defining a flow path around the first conduit and a plurality of fins extending from the fairing.

The fairing comprising a first portion corresponding to a shape of the first conduit and a second portion downstream of the first portion. The second portion tapering to a trailing point.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
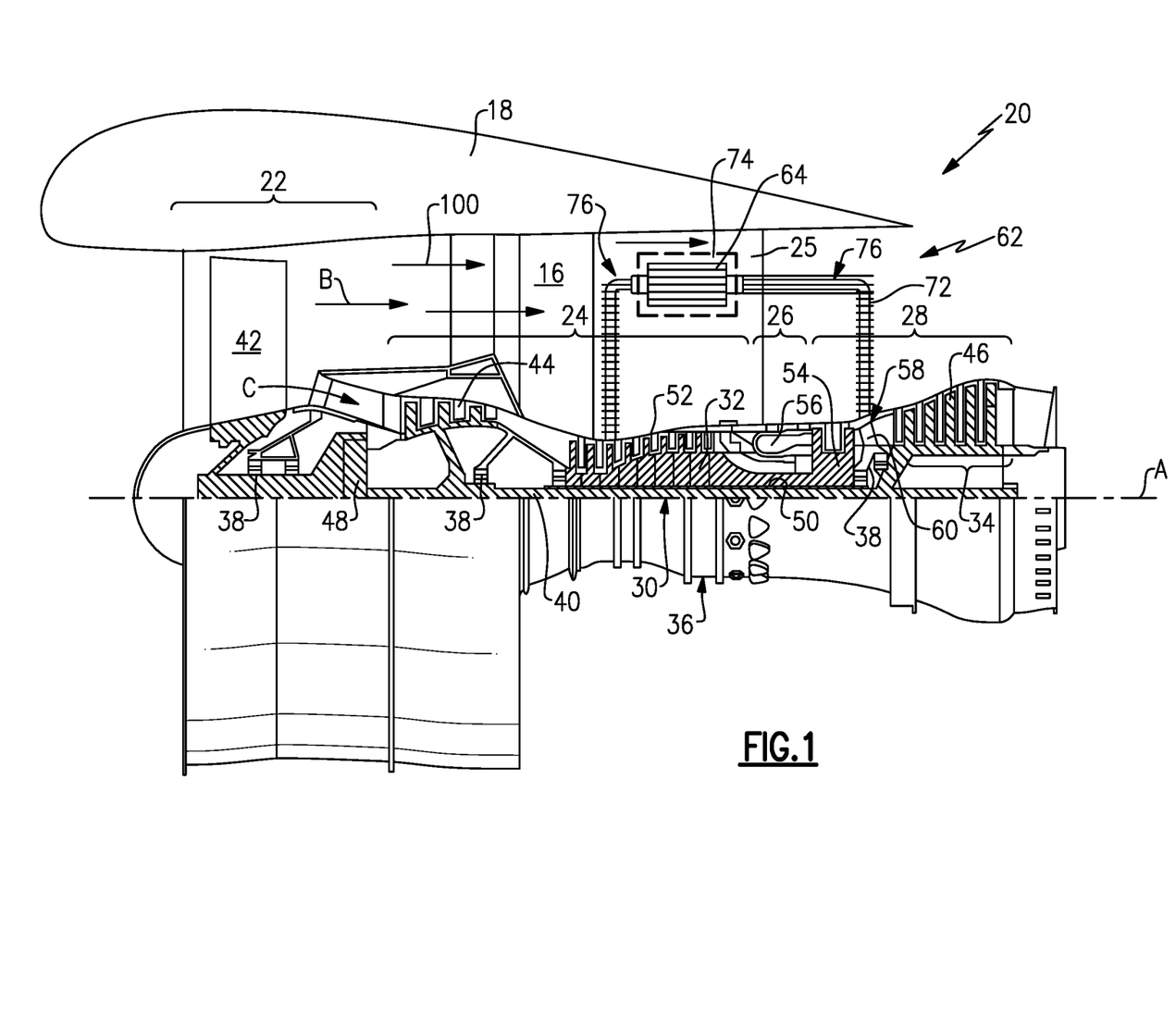
FIG. 1 is a schematic view of an example gas turbine engine including an example thermal management system embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct 16 defined within a nacelle 18, and also drives air along a core flow path C for compression and communication into the combustor section 26 then expansion through the turbine section 28. A bi-furcation structure 25 is provided between the nacelle 18 and the core engine structure. The bi-furcation structure 25 extends through the bypass duct 16 to support the engine 20 on an aircraft wing. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine 20 includes a thermal management system 62 for managing and maintaining a temperature of a flow. The example thermal management system 62 includes a first heat exchanger 64 that is disposed within the bypass duct 16 and exposed to a bypass airflow 100. A first conduit 70 provides an inlet of airflow from the compressor section 26 to the first heat exchanger 64. A second conduit 72 transmits this flow to another portion of the gas turbine engine. In this example, the first conduit 70 and the second conduit 72 communicate cooling air from a location within the compressor section 24 to a location within the turbine section 28. The first heat exchanger 64 includes features that place the hot flows from the compressor section 24 into communication with the cooling flow 100 through the bypass duct 16. The first heat exchanger 64 provides for the transfer of thermal energy between the two flows within a defined volume 74 that is specifically intended for the transference of thermal energy between adjacent flows. Accordingly, the first heat exchanger 64 provides specific passages that are in intimate contact to enable the cooling airflows.

The inlet conduit 70 extends from a portion of the engine into the bypass duct 16 to communicate an airflow to the heat exchanger 64. In one disclosed embodiment, the heat exchanger 64 is supported within the bi-furcation support 25. In this example, the heat exchanger 64 is supported within the bi-furcation structure 25, however, the heat exchanger may be supported within an airflow with other structures of the engine 20 and nacelle 18. The length of the inlet and outlet conduits 70, 72 include a thermal transfer augmenter that aids in the transference of thermal energy out of the flow contained within the conduit. In this disclosed example, the thermal transfer augmenter is a plurality of fins 76 attached to each of the conduits 70, 72.

Figure 2:
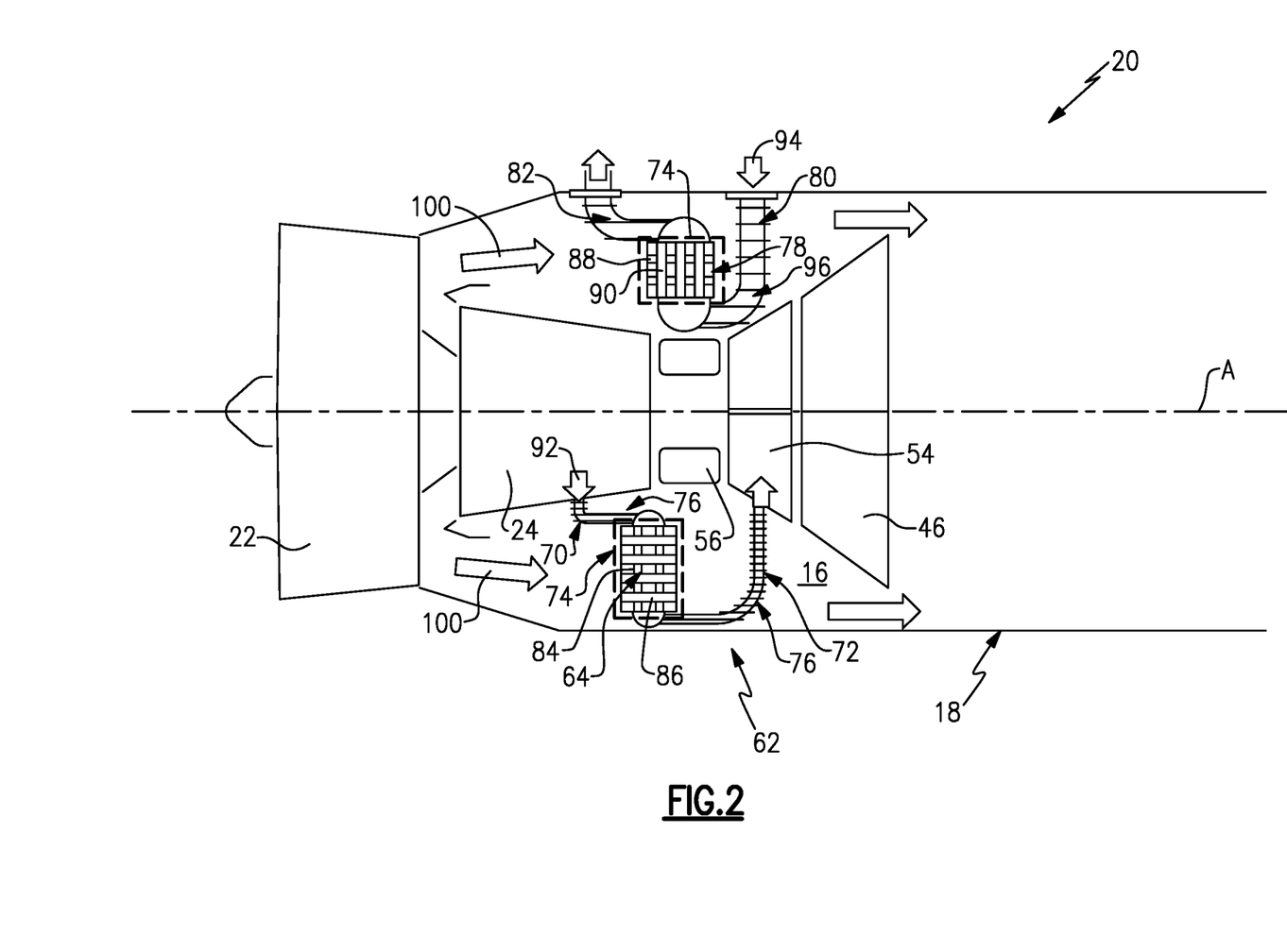
FIG. 2 is another schematic view of an example gas turbine engine including the example thermal management system embodiment.

Referring to FIG. 2, further features of the example thermal management system 62 are shown with the first heat exchanger 64 and a second heat exchanger 78. Both the first heat exchanger 64 and the second heat exchanger 78 define closed volumes schematically indicated at 74. Within the closed volume 74 of the first heat exchanger 64, are a plurality of first passages 84 that are in thermal communication with a plurality of second passages 86. The second heat exchanger 78 includes a plurality of first passages 88 and a plurality of second passages 90. The first heat exchanger 64 receives an inlet flow 92 into the first plurality of passages 84 and places it in thermal communication with a cooling airflow 100 that passes through the bypass duct 16 and the second plurality of passages 86.

Thermal communication between flows within the heat exchangers 64 and 78 is confined to the defined volume 74. However, the inlet conduits 70, 80 and the outlet conduits 72, 82 pass at least partially through the bypass airflow 100. The example thermal management system 62 include fins 76 that augment thermal transfer of airflows communicated to and exhausted from each of the heat exchangers 64, 78.

In this example, the first heat exchanger 64 includes the first conduit 70 and the second conduit 72 that both include a plurality of fins 76. The fins 76 aid in the transfer of thermal energy from the conduits 70, 72 to the airflow 100.

The second heat exchanger 78 communicates the inlet flow 94 through the inlet conduit 80 to the heat exchanger 78 and includes fins 96 that augment the transfer of thermal energy to the cooling airflow 100. The outlet conduit 82 also includes fins 96 for transferring thermal energy to the cooling airflow 100 through the bypass duct 16.

Figure 3:
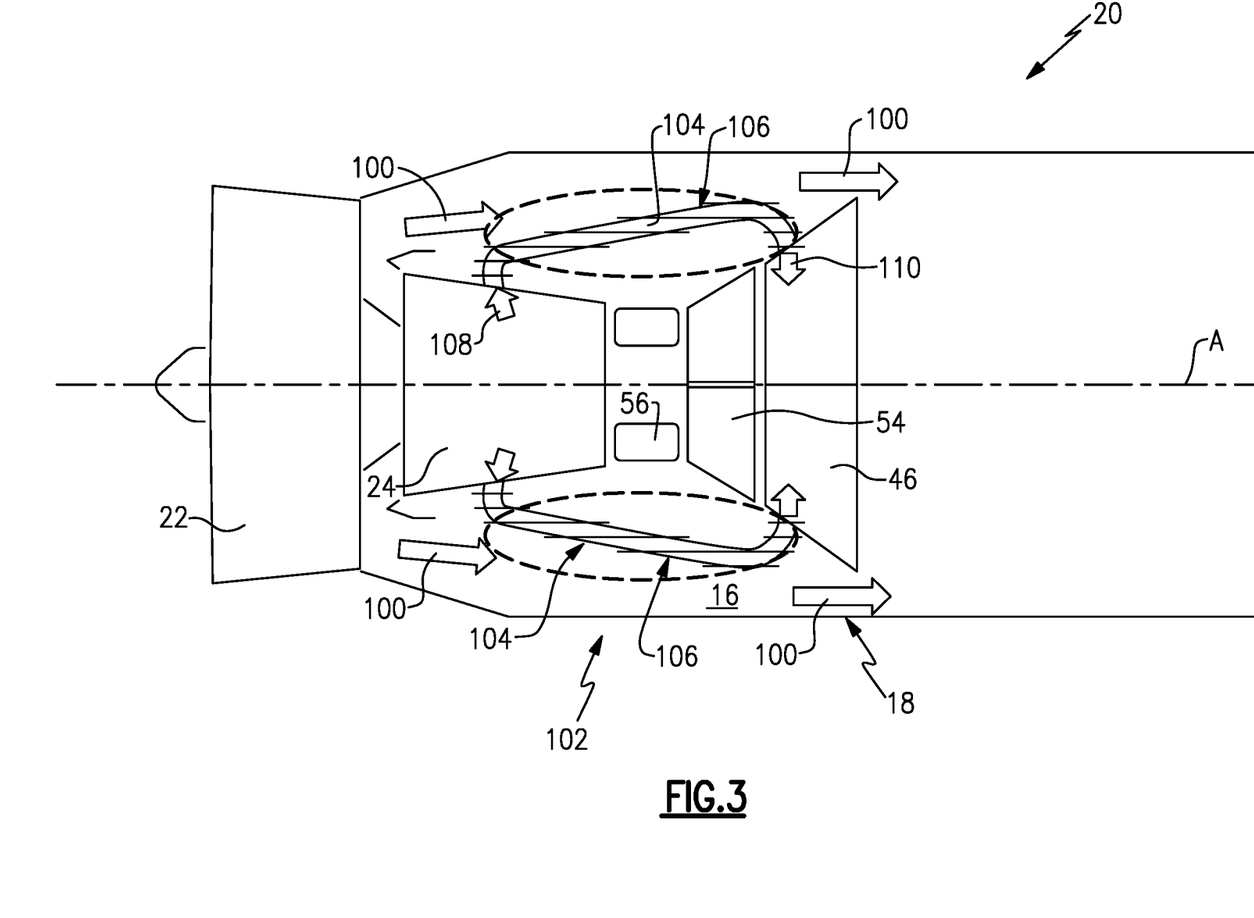
FIG. 3 is a schematic view of an example gas turbine engine including another thermal management system embodiment.

Referring to FIG. 3, another thermal management system 102 that includes conduits 104 that communicate airflow from an outlet 108 in the compressor section 24 to an inlet 110 in one of the turbine sections 46, 54. In this example, each of the conduits 104 include a plurality of fins 106 that are in heat exchange relationship with the flow 100 through the bypass duct 16. In this example, the conduits 104 direct airflow from the compressor section 24 through the bypass duct and into a thermal transfer relationship with the bypass flow 100 within the bypass duct 16. The features of the conduits 104 provide an increased amount of thermal transfer to augment cooling features provided within the thermal management system 102. Because the conduits 104 are run through an environment that includes a cooling airflow, the fins 106 provide an augmented thermal transfer capability that can augment thermal transfer provided by a heat exchanger or replace it as is shown in the system illustrated in FIG. 3.

Figure 4:
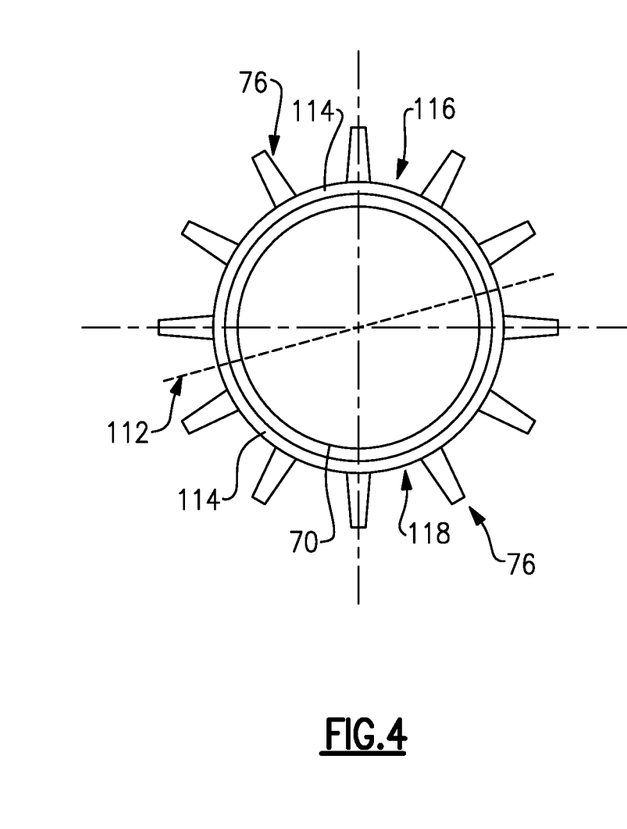
FIG. 4 is a cross-sectional view of a portion of an inlet conduit.
Figure 5:
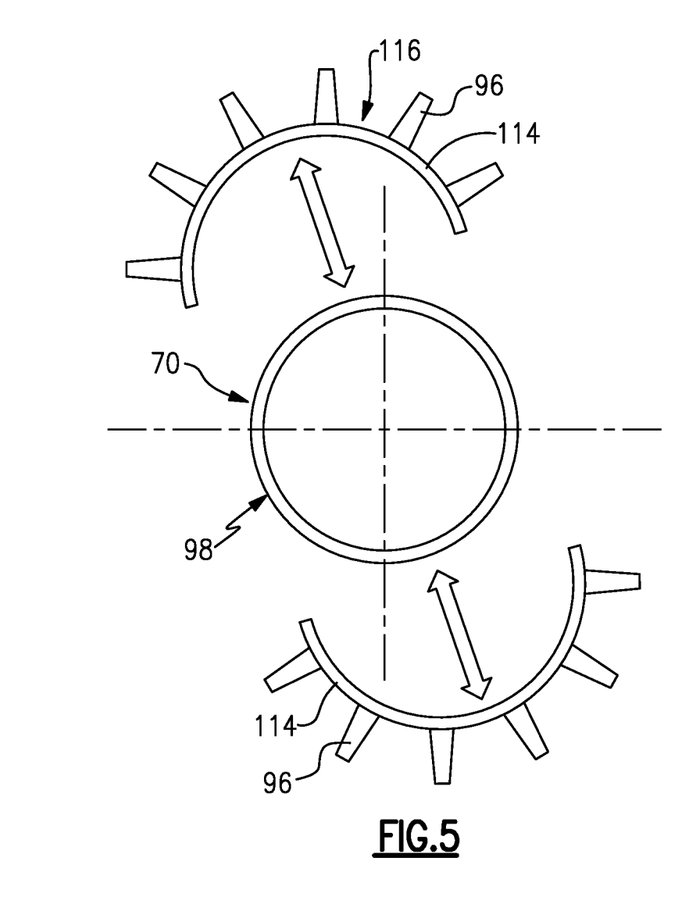
FIG. 5 is an exploded view of the example conduit assembly.

Referring to FIGS. 4 and 5, the example inlet conduit 70 is shown in cross-section and includes a first part 116 and a second part 118 attached to the conduit 70. Both the first and second parts 116, 118 include fins 76 that extend radially outward from a base portion 114. The base portion 114 is a circular portion that matches the outer surface of the conduit 70 allowing for contact with conduit 70 and thermally conductive heat path between conduit 70 and fins 76.

The example first and second parts 116, 118 are attached about the outer surface 98 (FIG. 5) of the conduit 70 to augment a thermal transfer capability of the conduit 70. The example conduit 70 is formed separate from the fins 76 provided in the first part 116 and the second part 118. In this example, the first part 116 and the second part 118 are separate parts that are assembled to the conduit 70 and are joined along a split line 112. This disclosed example includes first and second parts 116, 118, however, it is within the contemplation of this disclosure that more than two parts could be utilized and attached to the conduit 70. Because the first part 116 and the second part 118 are removable from the conduit 70, the fins 76 can be placed in specific locations that are exposed to a cooling airflow and oriented to provide desired interaction with the cooling air flow. Moreover, the capability of removing the first part 116 and the second part 118 enable inspection of the conduit 70 during routine maintenance.

Figure 6:
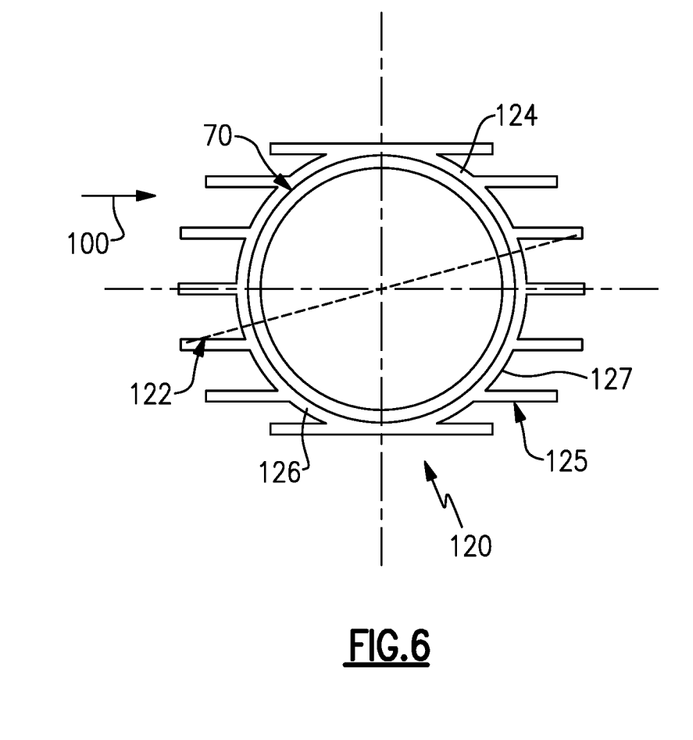
FIG. 6 is a cross-sectional view of another conduit assembly embodiment.
Figure 7:
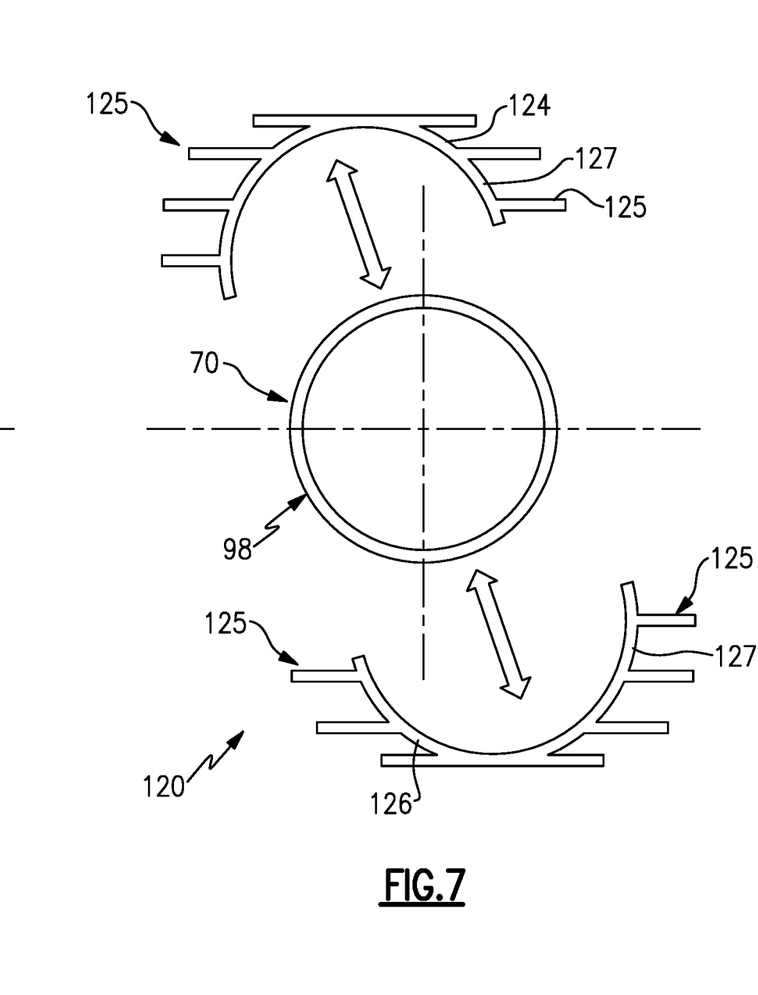
FIG. 7 is an exploded view of the example conduit assembly embodiment of FIG. 6.

Referring to FIGS. 6 and 7, another example conduit assembly 120 embodiment includes fins 125 that extend outward from base portions 127 of corresponding first and second parts 124,126. The fins 125 extend from the base 127 in a direction that is parallel to a cooling airflow 100. Moreover, each of the fins 125 are parallel to each of the other fins 145 disposed about the conduit 70. In this example, the first and second parts 124, 126 are assembled along a split line 122. The split line 122 is the separation point between the first and second parts 124, 126 and the location where the two parts abut against each other. Although two annular parts are shown, it is within the contemplation of this disclosure that any number of annular section could be joined to encircle the conduit 70.

Each of the first and second parts 124, 126 include the fins 125 that extend from the base portion 127 in a relative parallel orientation to one another. This generally parallel orientation may be purely linear or may include individual fins 125 following a helical path. The base portion 127 fits tightly against an outer surface 98 of the conduit 70. The fit between the base portion 127 and the outer surface 98 provides a thermally conductive contact that enables communication of thermal energy from the conduit 70 through the fins 125.

Figure 8:
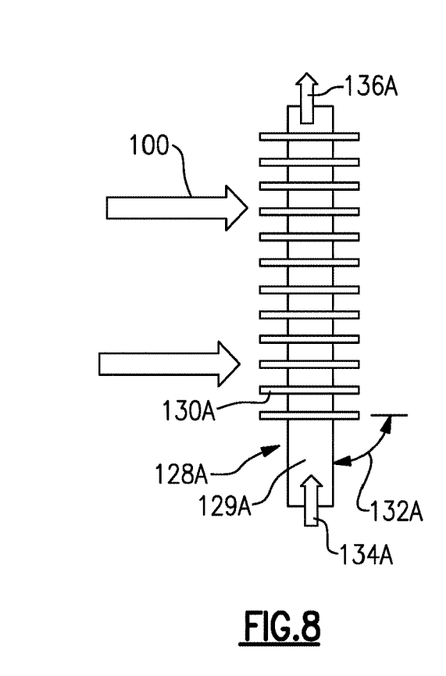
FIG. 8 is a schematic view of another conduit assembly embodiment.
Figures 9, 10:
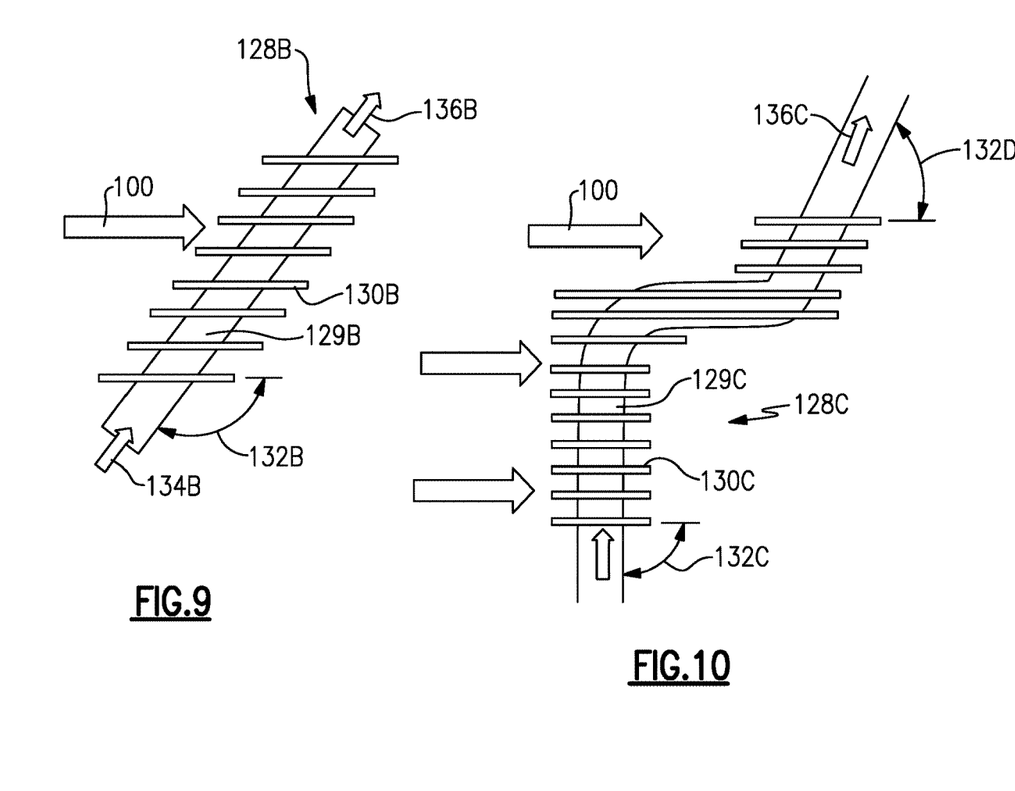
FIG. 9 is a schematic view of another conduit assembly embodiment.
FIG. 10 is another view of an example conduit assembly embodiment.

Referring to FIGS. 8, 9, and 10, additional example conduit assemblies 128A-C are schematically shown and include a plurality of fins 130A-C that are orientated at an angle 132A-C relative to the corresponding conduit 129A-C. Each conduit assembly 128A-C includes a corresponding inlet 134A-C and outlet 136A-C. The fins 130A-C are disposed at an angle that is generally parallel to the cooling airflow 100 crossing over the conduit assembly 128A-C. The airflow 100 passages over and within the space between the fins 130A-C of each conduit assembly 128A-C.

The angle 132A-C of each of the fins 130A for each of the disclosed conduit assembly embodiments provides a parallel orientation relative to the cooling airflow 100 to provide an efficient thermal contact with the cooling airflow 100 and not disrupt the airflow through the bypass duct. The parallel orientation is provided by orientating the fins 130A-C at an angle relative to the corresponding conduits 129A-C. Cooling fin orientation angle 132A-C may be generally consistent over a part length as shown, or in another embodiment may vary to account for and optimize interaction with local flow disturbances in cooling flow 100. In FIG. 8, the angle 132A is 90° relative to the conduit 129A to provide parallel airflow through a plurality of fins 130A.

The conduit assembly 128B orientates the fins 130B at an angle 132B that is greater than 90° to maintain the fins 130B in a parallel orientation relative to the cooling airflow 100. The conduit 129B is disposed at an angle relative to the cooling airflow 100. The angle of the conduit 129B may be any angle as needed to communicate airflow to a heat exchanger or other location within the engine.

Referring to FIG. 10, the example conduit assembly 128C includes a conduit that varies in direction relative to the cooling airflow and thereby includes fins 130C that include an angle that varies based on the conduit orientation relative to the direction of the cooling airflow. In this example, a first angle 132C is substantially transverse to the conduit 129C. A second portion of the conduit 129C is disposed at an angle 132D that is less than 90° and different than the angle 132C. The fins 130C within the section of the conduit 129C that is at the angle 132D are provided at a different angle relative to fins within the section of the conduit disposed at the angle 132C. The varying angles of the fins relative to the conduit 129C and the airflow 100 are provided to tailor thermal transfer to the application specific orientation.

Figure 11:
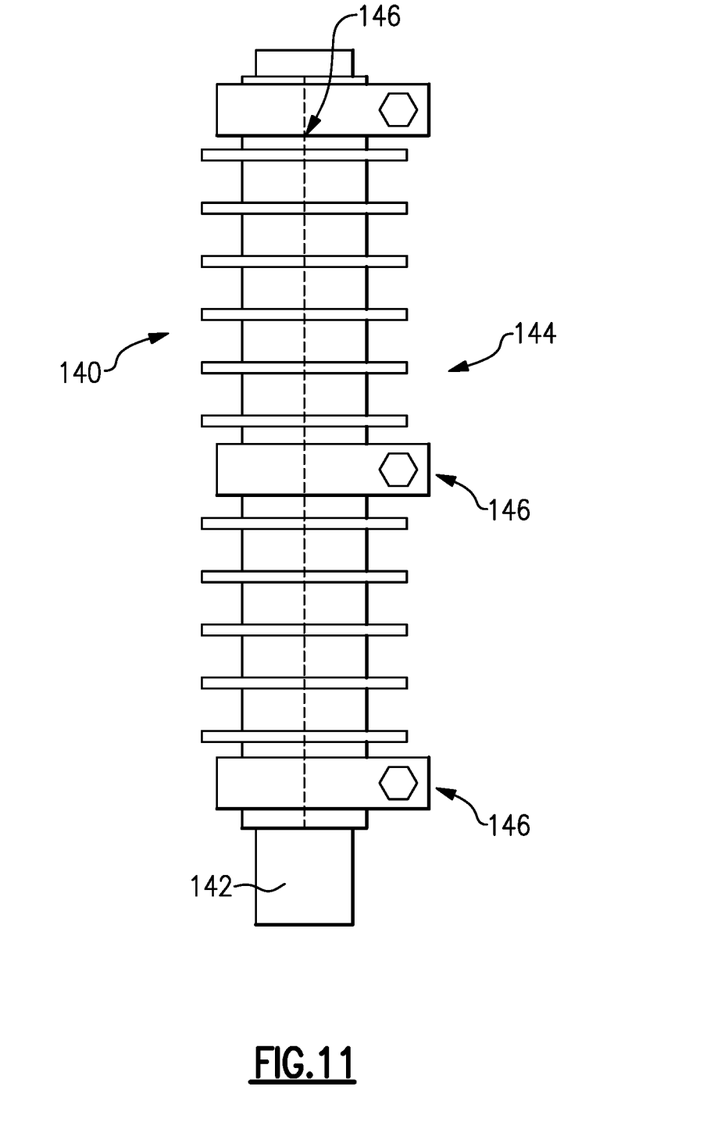
FIG. 11 is a schematic view of a conduit assembly embodiment including clamps to hold the thermal transfer augmenter.

Referring to FIG. 11, another example conduit assembly 140 includes attachment features for securing the sections of thermal augmentation to features to a conduit. In this example, conduit 142 includes fin assemblies 144 that are attached by way of one or more clamps 146 to the conduit 142. Clamps 146 may be split clamps with a threaded fastener as is illustrated in FIG. 11. The clamps 146 may also be of other designs that may be integral or separate from the conduit 142 and fin assemblies 144 as required to provide intimate thermal transfer contact with the conduit 142. Ability to replace provides ability to replace conduit assembly due to damage or degradation, modify/upgrade thermal performance, and inspect internal pressure carrying conduit.

Figure 12:
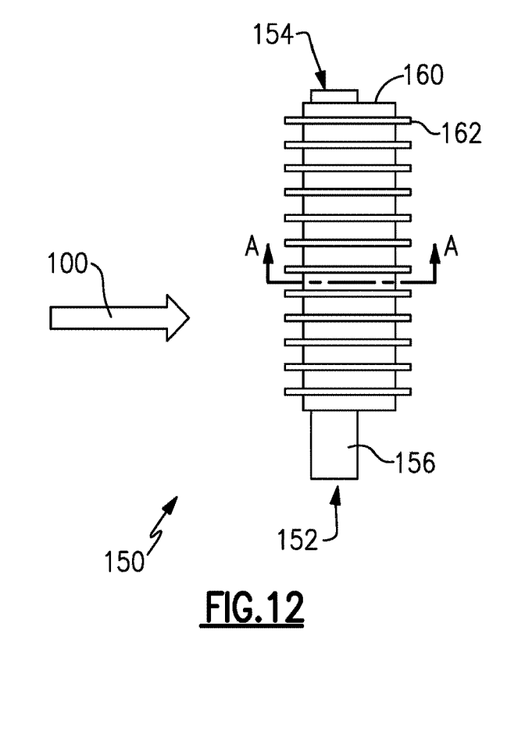
FIG. 12 is a schematic view of another conduit assembly embodiment.
Figure 13:
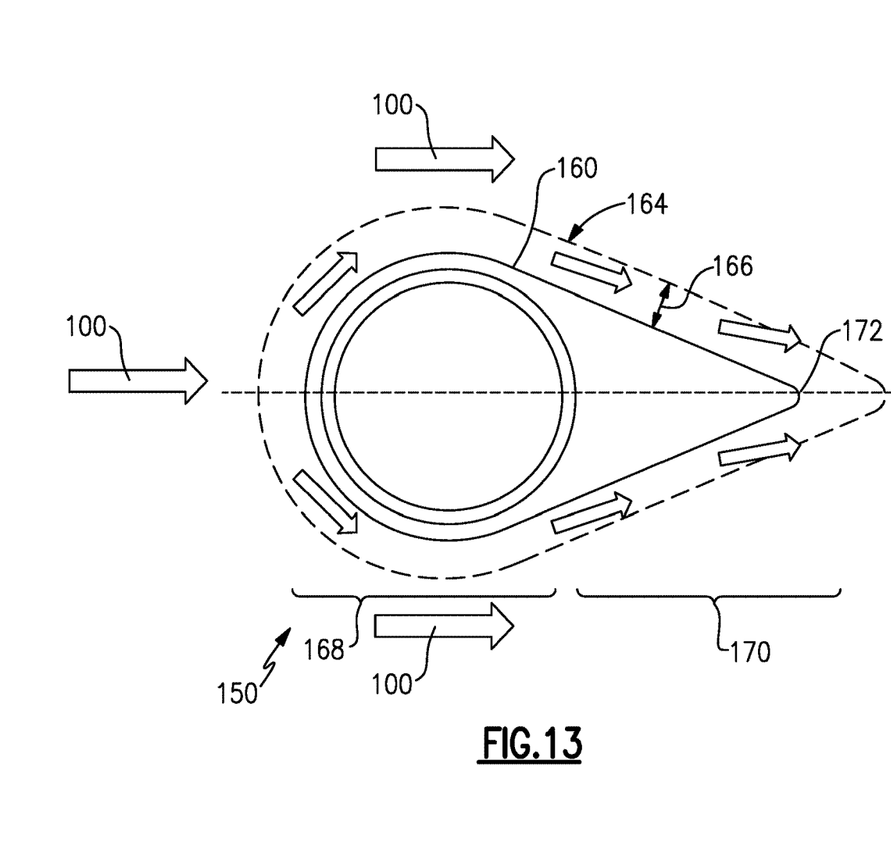
FIG. 13 is a cross-sectional view of the example conduit assembly embodiment shown in FIG. 12.

Referring to FIGS. 12 and 13, another example conduit assembly is schematically shown and indicated at 150. As appreciated, the conduit assembly 150 is disposed within a passage with a cooling airflow 100. The example conduit assembly 150 includes features that reduce disruption of the airflow 100 potentially caused by the conduit assembly 150.

In this example, the conduit assembly 150 includes a conduit 156 that receives a flow for cooling through an inlet 152 and exhausts the flow through an outlet 154. Between the inlet 152 and the outlet 154 thermal energy is transferred to the cooling airflow 100. A plurality of fins 162 are supported on a fairing 160 that is secured to the conduit 156. In this example, the fairing 160 includes a first portion 168 and a second portion 170. The first portion 168 of the fairing 160 is substantially circular and matches a contour of the underlying conduit 156. The second portion 170 is disposed downstream of the first portion 168 relative to a flow of the cooling airflow 100. The second portion 170 tapers from the first portion 168 to a trailing edge tip 172. The taper of the example conduit assembly 150 provides a contour shape indicated at 164 to improve airflow past the conduit assembly 150. A plurality of fins 162 extend from each portion of the fairing 160. In this disclosed example, each of the fins 162 are a common height 166 within each of the first portion 168 and the second portion 170. The common height 166 of each of the fins 162 follows the contoured shape 164. The elongated taper portion provided at 170 provides for a tapered transition such that airflow smoothly flows around the conduit assembly 150 with little disruption. It should be appreciated, that the fins 162 may be of different heights along the fairing 160 such that the contour 164 is different than the shape of the fairing 160 and is within the contemplation of this disclosure.

Moreover, each of the disclosed conduit assemblies maybe formed as integral or separate parts and from materials suitable for the operational environment. The material may include metals and/or plastic materials. Metallic parts may be machined, cast, or produced using additive manufacturing including direct metal laser sintering, laser free-form deposition, and electron beam machining. The conduit assemblies may be solid, or at least partially porous for reduced weight and/or enhanced thermal heat transfer. This includes components fabricated from sintered wire forms and metallic foams. Alloys may include titanium, aluminum, nickel, steel and cobalt. Thermal interaction between conduit assemblies and internal fluid conduit accommodating internal fluid pressure may be augmented using a soft or compliant layer compatible with thermal conductive properties. This insures intimate contact and path for thermal conductivity while minimizing interaction that could scratch or mar the surface of the fluid pressure carrying structure which could degrade component life. Additionally, while the example conduit assemblies are disclosed by way of example as extending into a bypass duct, the conduit assemblies maybe disposed within any passages or duct including a flow of air or other media that enable and provide for a transfer of thermal energy. The disclosed flows through the example conduit assemblies may also be provide an alternate manner to communicate thermal energy between flows at different temperatures.

The example conduit assemblies include features that augment thermal transfer in conduits of a thermal management system that are outside of passages within a heat exchanger to aid in the transfer of thermal energy.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A thermal management system comprising:
a heat exchanger defining confined volume for thermal transfer between a first flow within a first passage and a second flow within a second passage;
a first conduit outside the confined volume for communicating the first flow to the first passage of the heat exchanger; and
a thermal transfer augmenter attached to the first conduit, wherein the thermal transfer augmenter is split into at least two sections attachable around the first conduit.

2. The thermal management system as recited in claim 1, wherein thermal transfer augmenter comprises a plurality of fins extending radially outward from the first conduit.

3. The thermal management system as recited in claim 1, wherein the thermal transfer augmenter comprises a plurality of parallel extending fins that extend outward from the first conduit.

4. The thermal management system as recited in claim 1, including an interface providing a thermally conductive contact with an outer surface of the first conduit and the thermal transfer augmenter.

5. The thermal management system as recited in claim 1, including at least one clamp securing the at least two sections around the first conduit.

6. A thermal management system comprising:
a heat exchanger defining confined volume for thermal transfer between a first flow within a first passage and a second flow within a second passage;
a first conduit outside the confined volume for communicating the first flow to the first passage of the heat exchanger; and
a thermal transfer augmenter attached to the first conduit, wherein the thermal transfer augmenter comprises a fairing defining a flow path around the first conduit and a plurality of fins extending from the fairing.

7. The thermal management system as recited in claim 6, wherein the fairing includes a first portion corresponding to a shape of the first conduit and a second portion downstream of the first portion, the second portion tapering to a trailing point.

8. The thermal management system as recited in claim 7, wherein the plurality of fins extend from the fairing an equal distance to follow a contour of the first portion and the second portion.

9. A gas turbine engine comprising:
a fan section that drives air along a bypass flow path;
a heat exchanger defining confined volume for thermal transfer between a first flow within a first passage and the flow of air through the bypass flow path;
a conduit at least partially exposed to a flow through the bypass flow path, the conduit configured to communicate the first flow to the confined volume of the heat exchanger; and
a thermal transfer augmenter attached to the first conduit, wherein the thermal transfer augmenter is split into at least two section attachable around the conduit.

10. The gas turbine engine as recited in claim 9, including a compressor section and a turbine section, wherein the conduit communicates bleed air from the compressor section to the turbine section.

11. The gas turbine engine as recited in claim 9, including a second conduit that provides for the communication of the first flow exiting the heat exchanger to a component of the gas turbine engine.

12. The gas turbine engine as recited in claim 9, wherein thermal transfer augmenter comprises a plurality of fins extending radially outward from the first conduit.

13. The gas turbine engine as recited in claim 9, wherein the thermal transfer augmenter comprises a plurality of parallel extending fins that extend outward from the first conduit.

14. A gas turbine engine comprising:
a fan section that drives air along a bypass flow path;
a heat exchanger defining confined volume for thermal transfer between a first flow within a first passage and the flow of air through the bypass flow path;
a conduit at least partially exposed to a flow through the bypass flow path, the conduit configured to communicate the first flow to the confined volume of the heat exchanger; and
a thermal transfer augmenter attached to the first conduit, wherein the thermal transfer augmenter comprises a fairing defining a flow path around the first conduit and a plurality of fins extending from the fairing, the fairing comprising a first portion corresponding to a shape of the first conduit and a second portion downstream of the first portion, the second portion tapering to a trailing point.

15. A method of augmenting heat transfer comprising:
directing a first flow through a first conduit to a first passage of a heat exchanger;
directing a second flow to a second passage of the heat exchanger, wherein the heat exchanger defines a confined volume where the first passage is in thermal communication with the second passage; and
transferring heat from the first flow through a thermal transfer augmenter assembled to the first conduit outside of the confined volume of the heat exchanger, wherein the thermal transfer augmenter comprises a plurality of fins split into at least two sections and including assembling the at least two sections around the first conduit.

16. A method of augmenting heat transfer comprising:
directing a first flow through a first conduit to a first passage of a heat exchanger;
directing a second flow to a second passage of the heat exchanger, wherein the heat exchanger defines a confined volume where the first passage is in thermal communication with the second passage; and transferring heat from the first flow through a thermal transfer augmenter assembled to the first conduit outside of the confined volume of the heat exchanger, wherein the thermal transfer augmenter comprises a fairing defining a flow path around the first conduit and a plurality of fins extending from the fairing, the fairing comprising a first portion corresponding to a shape of the first conduit and a second portion downstream of the first portion, the second portion tapering to a trailing point.

\* \* \* \* \*